May 7, 1968 W. A. HARDY 3,382,367

TECHNIQUES FOR FORMING MULTIPLE IMAGES OF AN OPTICAL PATTERN USING SPHERICAL MIRRORS

Filed Dec. 17, 1964 4 Sheets-Sheet 1

INVENTOR.
WILTON A. HARDY
BY Francis J. Thomas
ATTORNEY

United States Patent Office 3,382,367

Patented May 7, 1968

3,382,367

TECHNIQUES FOR FORMING MULTIPLE IMAGES OF AN OPTICAL PATTERN USING SPHERICAL MIRRORS

Wilton A. Hardy, Ossining, N.Y., assignor to International Business Machines Corporation, New York, N.Y., a corporation of New York Filed Dec. 17, 1964, Ser. No. 419,003
27 Claims. (Cl. 250—216)

This invention relates to optical techniques for forming multiple images of an applied pattern.

The reproduction of an optical pattern is desirable in many applications. In one important environment, closely-spaced data on a mask (transparency) can be readily sensed if the various data elements can be isolated. This can be accomplished by reproducing the pattern of data at several distinct positions and sensing one or more data elements from each reproduction, in sequence or simultaneously, rather than attempting to sense all data elements from a single pattern.

Various techniques for optically reproducing patterns are well known, including those using partially-silvered mirrors and lenses. The techniques generally require a separate optical channel for each image that is to be formed, or the multiple-formed images are not identical reproductions of the applied pattern.

In the present invention, three spherical mirrors (or their equivalent) are arranged such that images of the applied pattern are formed on one of the mirrors by alternate reflections of the other two mirrors. In certain basic respects, the device resembles the absorption cell described in a paper entitled, "Long Optical Paths of Large Aperture," by John U. White that was published in the Journal of the Optical Society of America, vol. 32, pp. 285–288, May 1942. However, in the absorption cell, the formation of multiple images of a spot of light is incidental to the function of providing a long optical path in a constrained region. In the present invention, a pattern of data is multiply-reproduced in a data sensing environment wherein various predetermined data elements are sensed in each of several of the reproduced images. Since the multiple images are sequentially formed by a series of reflections, the data elements can be sequentially sensed when the light source is pulsed or otherwise modulated. Thus, the data is effectively scanned, so the present invention is suitable for use as a scanner in such applications as character recognition.

It is, thus, a primary object of the present invention to provide techniques for forming multiple images of an applied optical pattern.

Another object is to provide techniques for forming multiple images of an applied pattern to enable various portions of the pattern to be sensed in each of several of these images.

Another object of the present invention is to provide techniques for sensing data elements in an applied optical pattern by multiply-reproducing the pattern and selecting a portion of each reproduction for application to photosensitive apparatus, wherein electrical signals representative of the data elements are produced.

A further object is to provide techniques for time-sequentially forming multiple images of an applied data pattern by multiple reflections of the pattern, where a portion of the data is sensed in each of several of these images to provide a time-varying representation of the data elements according to a predetermined sequence.

The foregoing and other objects, features and advantages of the invention will be apparent from the following more particular description of the preferred embodiments of the invention, as illustrated in the accompanying drawings.

Figure 1:
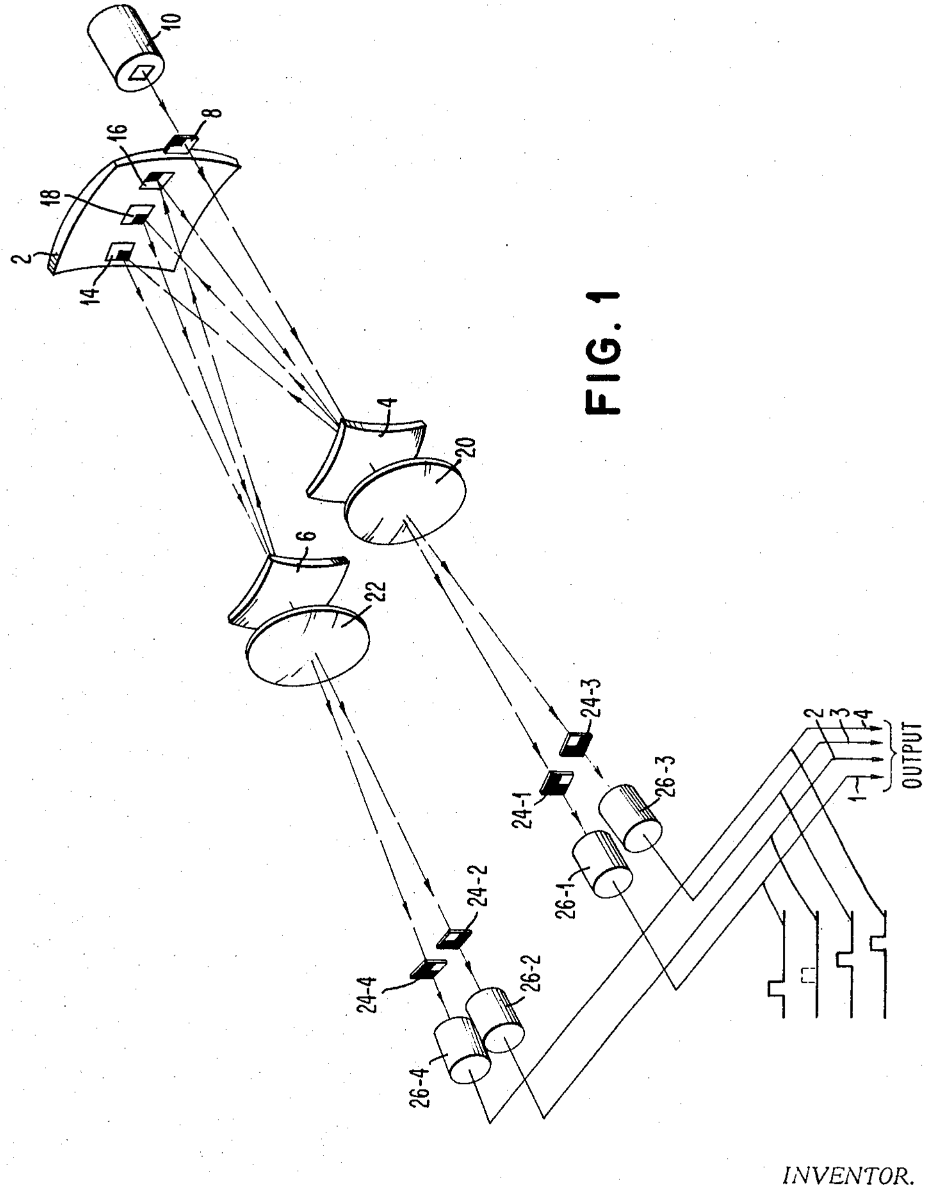
FIG. 1 is a diagram showing a preferred embodiment of the invention.
Figures 2, 4:
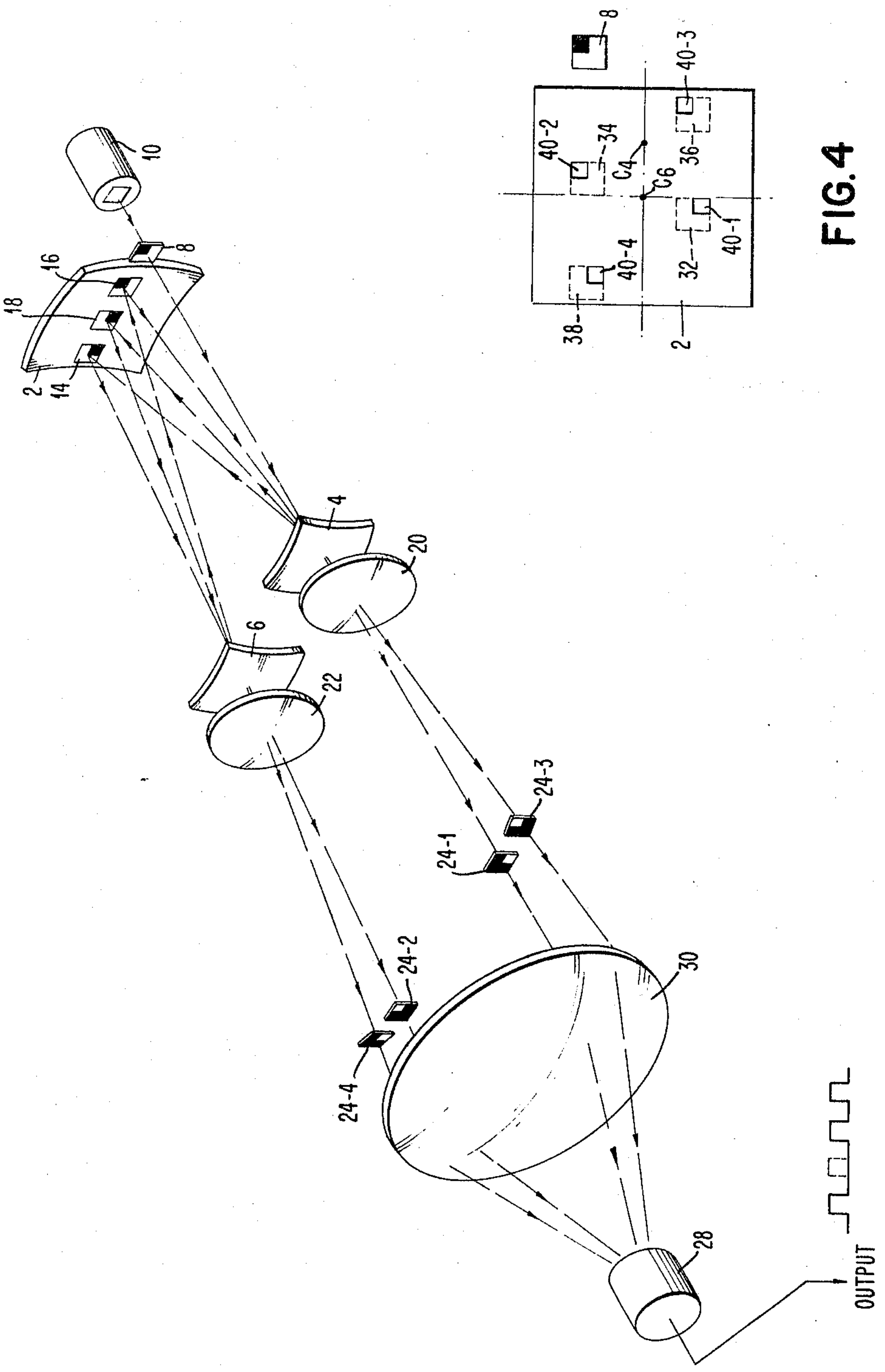
FIG. 2 is a diagram showing a second embodiment of the invention.
Figure 3A:
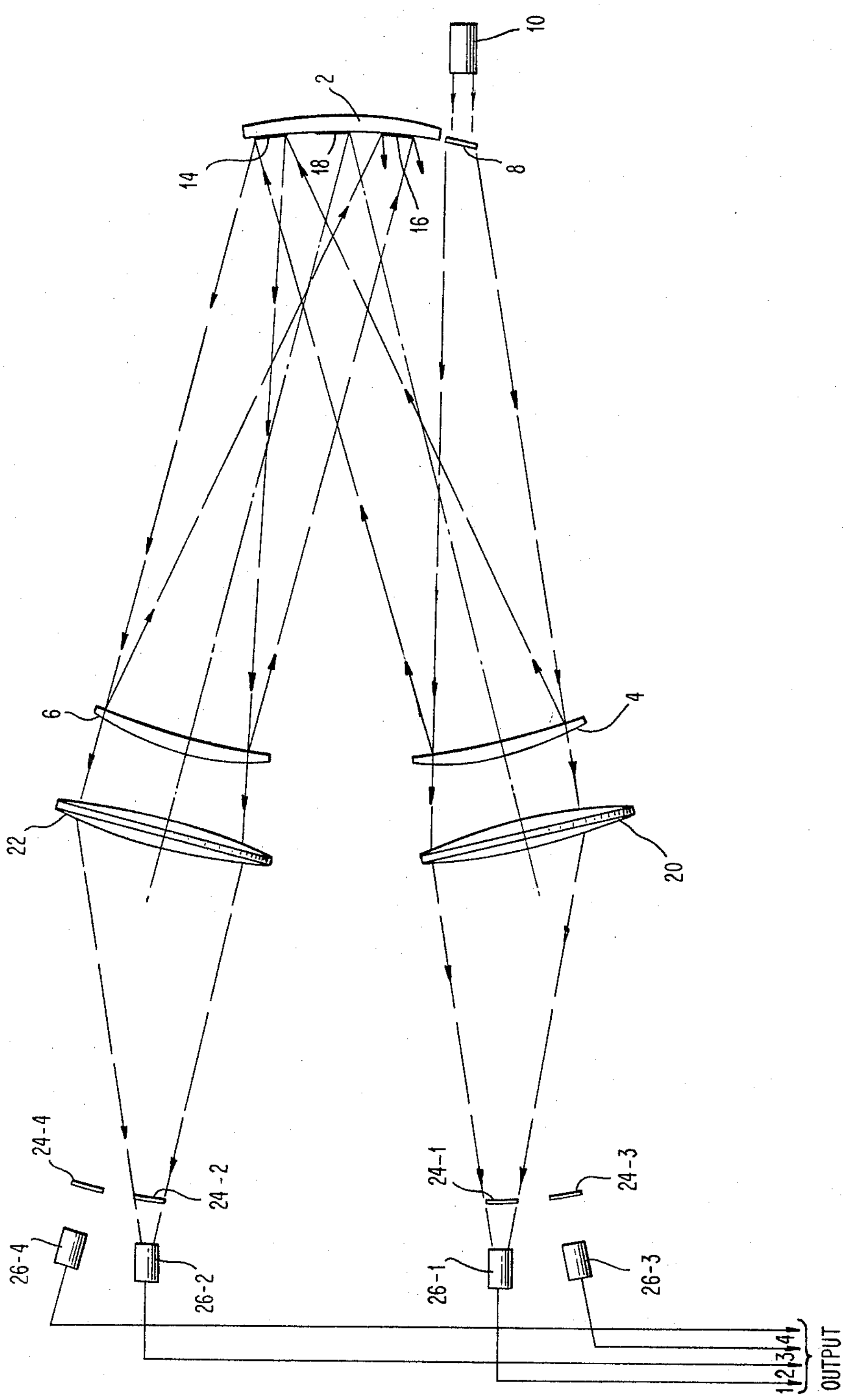
Figure 3B:
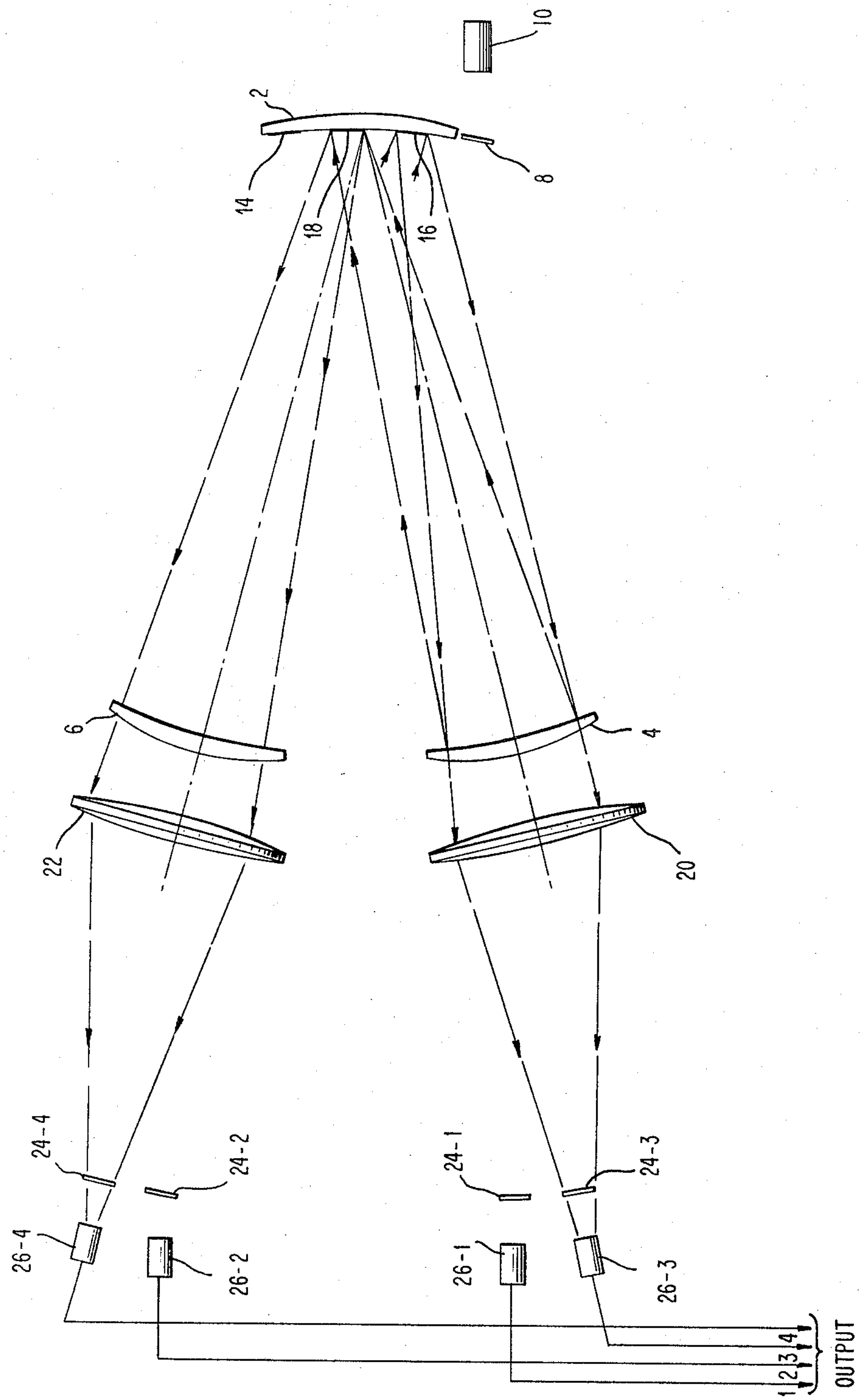

FIGS. 3*a* and 3*b* are explanatory diagrams illustrating the operation of the apparatus shown in FIGS. 1 and 2.

FIG. 4 is a diagram illustrating a modification of the embodiments shown in FIGS. 1 and 2.

In the preferred embodiment of the invention as shown in FIG. 1, three spherical mirrors 2, 4, 6 having equal radii of curvature are arranged to provide multiple reflections. Mirror 2 is arranged with its center of curvature between mirrors 4 and 6 and mirrors 4 and 6 are arranged with their centers of curvature in the plane of mirror 2. In the preferred embodiment of the invention, the center of curvature of mirror 4 is slightly to the right of the midpoint of mirror 2 and the center of curvature of mirror 6 is slightly to the left of the midpoint of mirror 2. The positioning of the centers of curvature of the mirrors 4 and 6 in the plane of mirror 2 determines the number and position of images which are formed. Obviously, other focussing reflecting techniques can be employed. For example, a flat mirror and a lens are the well-known optical equivalent of a spherical mirror.

A transparency 8 containing data elements is arranged in the plane of mirror 2. In FIG. 1, a mask (transparency) is shown to be divided into four quadrants, each containing an element of data. The upper left (first element), lower left (third element), and the lower right (fourth element) quadrants are translucent, indicating the binary value "1," and the upper right (second element) quadrant is opaque, indicating a binary value "0." Thus, the mask contains the binary number 1011. Obviously, the transparency need not be physically placed in the plane of mirror 2, provided that an image of the transparency is formed in that plane. A source of light 10 (for example, a laser) is focused on the mask 8. The mask pattern is then successively imaged uopn mirror 2 by alternate reflections of mirrors 4 and 6. The explanatory drawings of FIGS. 3*a* and 3*b* illustrate the extreme light paths in the system. Initially, as shown in FIG. 3*a*, the light that is passed by mask 8 is reflected by mirror 4 to form a real image at position 14 on mirror 2. This image is then reflected by mirror 6 to form a real image at position 16 on mirror 2. To avoid confusion, the subsequent light paths are shown in FIG. 3*b*. The image at position 16 is then reflected by mirror 4 to form a real image at position 18 on mirror 2, and the image is then directed toward mirror 6. Subsequent images on mirror 2 are similarly formed by alternate reflections by mirrors 4 and 6. The images formed by reflections of mirror 4 are formed sequentially from left to right across the face of mirror 2 and the images formed by reflections of mirror 6 are formed from right to left. Eventually, an image is reflected at an angle which causes it to fall outside of the area of mirror 2 and the sequence is terminated. While only a few reflections are shown in FIGS. 1, 3*a* and 3*b*, for the sake of simplicity, as many as fifty or more images can readily be formed on mirror 2 by centering mirrors 4 and 6 extremely close to the midpoint of mirror 2. Except for minor distortions due to spherical aberration (which can be reduced by proper selection of the numerical aperture of the system) in the optical system, the images are identical in size and shape because of the use of spherical mirrors.

In the embodiment of FIG. 1, both mirrors 4 and 6 are centered on the horizontal axis of the face of mirror 2, causing the images to traverse this axis. The images can, however, be cause to traverse non-coincident paths by suitable adjustment of the centers of curvature of the mirrors with respect to the position of the input image, such as centering one mirror on the horizontal axis and the other above or below this axis. The coordinates ($x_n$, $y_n$) of the $n^{th}$ image on mirror 2, where $n$ is an even number, are determined by:

$$x_n = x_a - n(x_1 - x_2)$$

$$y_n = y_a - n(y_1 - y_2)$$

and the coordinates for the $n^{th}$ image when $n$ is an odd number are:

$$x_n = -x_a + 2_{x1} + (n-1)(x_1 - x_2)$$

$$y_n = -y_a + 2_{y1} + (n-1)(y_1 - y_2)$$

where ($x_1$, $y_1$) are the coordinates of the center of mirror 4, where ($x_2$, $y_2$) are the coordinates of mirror 6, and where ($x_a$, $y_a$) are the coordinates of the input mask. A practical apparatus employs radii of curvature of approximately 150 cm. and mirrors with diameters of about 5 cm.

The sensing apparatus is arranged behind mirrors 4 and 6 to provide more physical spacing between the components. These mirrors are dielectrically coated (for example, 99% reflecting) to permit some light to be transmitted. The reflectivity R of the mirrors must approach 1.0, as the intensity $I_n$ of the $n^{th}$ image on mirror 2 equals $I_a R^{2n}$ where $I_a$ corresponds to the intensity of the applied image.

The light that is transmitted by mirrors 4 and 6 is focused by lenses 20 and 22 (arranged behind the mirrors) to form real images behind the mirrors. Four masks 24–1, 24–2, 24–3, and 24–4 are located in the plane of the images that are developed by lenses 20 and 22. Each mask contains one transparent quadrant to act as a gate for one data element in the image. Thus, mask 24–1 is placed at the position where the first image is developed by lens 20 (before any reflections). Mask 24–2 coincides in position with the second developed image (when image 14 on mirror 2 is reflected toward, and partially through mirror 6). Similarly, masks 24–3 and 24–4 are positioned coincidentally with the third and fourth images. Due to one inversion of the image in each reflection and one inversion by lenses 20 and 22, the odd-numbered masks 24–1 and 24–3 are inverted. Hence, for example, the first element of the input pattern (upper-left quadrant) is passed by the transparent lower-right quadrant of mask 24–1. The even-numbered masks 24–2 and 24–4 are not inverted because the applied images are inverted an even number of times. Thus, for example, mask 24–4 is transparent in the lower-right quadrant. Obviously, each mask can contain several transparent areas to permit several data elements to be simultaneously sensed.

The masks are shown diagrammatically in FIGS. 3*a* and 3*b* with respect to the optical axes of the channels (where one channel includes mirror 4 and lens 20, and the other channel includes mirror 6 and lens 22). As described above, each mask 24 passes the light originating from one quadrant of the applied data transparency 8. This light is directed to a corresponding photodetector 26–1, 26–2, 26–3 and 26–4. The output signals from the photodetectors 26 represent the system output and and are continuously present if light source 10 is continuous. When the light source is pulsed, the signals occur at the times indicated by the waveshapes in FIG. 1. The delay between output signals is caused by the time required for light to travel through one complete reflection (from mirror 2 to either mirror 4 or 6, and then back to mirror 2). This time equals $2R/C$, where R denotes the radii of curvature of the mirrors, and C denotes the speed of light ($3 \times 10^{10}$ cm./sec.). For example, where the radii of curvature of the mirrors equals 150 cm., the signals are spaced by 10 nanoseconds ($10^{-8}$ sec.).

In order to get a sequential pulsed output, the light source is preferably pulsed for a period of time that does not exceed the time for one complete reflection. This time can be extended either by spreading the mirrors or by grinding the mirrors on a medium having a high index of refraction. Alternatively, a long duration pulse of light can be applied and the output of the photodetector differentiated to sense the leading edge of the light traversing the system. The time between readout of successive data elements can be further extended by avoiding readout during certain reflections. For example, when all masks are aligned behind either mirror 4 or mirror 6 alone, the time interval is doubled. Obviously, further time extensions are possible by masking the light produced during every third, fourth, etc. reflection instead of every second reflection.

Thus, the input data pattern representing the binary number 1011 is sensed and develops electrical signals on the first, third and fourth output leads corresponding to the "1" data elements. No signal is developed on the second output lead, corresponding to the "0" data element.

Instead of scanning coded binary data elements, the system can be used to scan uncoded data, such as alphanumeric characters in a character recognition system. Other uses include fingerprint identification, waveform analysis, and photographic analysis.

A second embodiment of the invention is shown in FIG. 2. This embodiment differs from the embodiment shown in FIG. 1 only with respect to the photodetection apparatus that is located behind mirrors 4 and 6. Instead of utilizing separate photodetectors 26 (FIG. 1), a single photodetector 28 is employed and the signals from all masks 24 are directed by a lens 30 to the photodetector 28. Lens 30 images the surface of mirror 2 onto the photosensitive surface of detector 28 (except for the light blocked by masks 24). The light source 10 is pulsed, as described with respect to FIG. 1, and the system output contains a train of data pulses corresponding to the data elements in the applied pattern transparency 8. Thus, the output binary number 1011 is represented by a pulse, followed by the absence of a pulse, followed by two pulses. As in the embodiment of FIG. 1, the distance between the pulses is determined by the radii of curvature of the mirrors.

The embodiment of FIG. 2 is not only suitable for use in scanning patterns of binary data elements, but the input transparency 8 can contain, for example, alphanumeric characters in a recognition environment.

In alternative embodiments corresponding to those of FIGS. 1 and 2, the data is sensed behind mirror 2 instead of behind mirror 4 or mirror 6. Although the small amount of light that is transmitted by mirror 2 can be sensed by reimaging the reflected images that are formed on mirror 2 upon appropriately-positioned masks and photodetectors, preferably mirror 2 contains transparent areas in its reflective coating that correspond to one or more predetermined data elements in each image. In this alternative embodiment, the reproduced images of transparency 8 are formed along non-coincident paths by adjustment of the relative positions of the center of curvature of mirrors 4 and 6 with respect to the position of the applied image as illustrated in FIG. 4.

With the geometry shown in FIG. 4, the first reflected image 32 is formed by a reflection of the input transparency 8 by mirror 4. The second image 34 is formed by a reflection of image 32 by mirror 6. Subsequent (non-overlapping) images 36 and 38 are formed in the same manner. The dielectric coating of mirror 2 is removed in regions 40–1, 40–2, 40–3 and 40–4 to permit light to be transmitted to one or more photodetectors as in the output sensing techniques described above with respect to FIGS. 1 and 2. The removed coating (FIG. 4) corresponds to the transparent regions of masks 24 in FIGS. 1 and 2, and this defines the selection of data elements in the transparency 8. During each successive reproduction of the image one data element is sensed (or greatly attenuated) because of the absense of the reflecting coating on mirror 2; however, the loss of data in the succeeding reflected images does not adversely affect the operation of the system because it is no longer needed, having been transmitted to the photodetectors. The alternative techniques have the advantage of providing substantially the full incident intensity of each illuminated data element in transparency 8 to the photodetection apparatus.

The mirrors can be physically or electro-optically adjusted to correct alignment errors or to enable the same masks to sequentially sample different data elements. Electro-optical reflection techniques are shown in an article entitled, "Light Beam Deflection Using the Kerr Effect in Single Crystal Prisms of $BaTiO_3$," by W. Haas, R. Johannes, and P. Cholet in Applied Optics, vol. 3, No. 8, August 1964, at pp. 988–989.

The above-described techniques provide image reproduction without significant distortion. These techniques are useful in many environments including data sensing systems, where closely-spaced data elements can be separately sensed sequentially or simultaneously in different reproduced images. In this manner, photodetection apparatus can be conveniently positioned over a larger physical area than is possible when all data elements are sensed directly from the applied pattern. Furthermore, the data elements can be sensed in a predetermined sequence to produce time-varying output data. Since the input pattern is effectively scanned, the system is suitable for use in a recognition environment as a substitute for a flying spot scanner.

While the invention has been particularly shown and described with reference to preferred embodiments thereof, it will be understood by those skilled in the art that various changes in form and details may be made therein without departing from the spirit and scope of the invention.

What is claimed is:

1. An optical system comprising, in combination:
means for applying an optical image to the system;
a plurality of spherical mirrors that are arranged to form multiple, essentially-identical, reproductions of the applied image by multiple reflections;
and a plurality of indicating means, each responsive to one of said reproduced images for providing an indication that is dependent upon a portion of the applied image.

2. The apparatus described in claim 1, wherein two spherical mirrors are arranged to alternately reflect an image in the plane of a third spherical mirror back to the third mirror at a succession of positions on the mirror.

3. The apparatus described in claim 1, wherein the indicating means are responsive to light that is transmitted by at least one mirror.

4. The apparatus described in claim 2, wherein the indicating means are responsive to light that is transmitted by at least one mirror.

5. The apparatus described in claim 2, wherein the indicating means are responsive to light that is transmitted by at least one of said two mirrors.

6. The apparatus described in claim 3, wherein the indicating means comprises means for imaging the transmitted light upon a plurality of masks where each image is a reproduction of the applied image.

7. The apparatus described in claim 5, wherein the indicating means comprises means for imaging the transmitted light upon a plurality of masks where each image is a reproduction of the applied image.

8. The apparatus described in claim 6, wherein an image is momentarily applied to the system and images are time sequentially formed on the masks as the applied image is multiply-reflected.

9. The apparatus described in claim 7, wherein an image is momentarily applied to the system and images are time-sequentially formed on the masks as the applied image is multiply-reflected.

10. The apparatus described in claim 6, further comprising photosensitive means responsive to the light transmitted by the masks.

11. The apparatus described in claim 7, further comprising photosensitive means responsive to the light transmitted by the masks.

12. The apparatus described in claim 8, further comprising photosensitive means responsive to the light transmitted by the masks.

13. The apparatus described in claim 9, further comprising photosensitive means responsive to the light transmitted by the masks.

14. The apparatus described in claim 10, wherein a separate photosensitive device is responsive to the light transmitted by each mask.

15. The apparatus described in claim 11, wherein a separate photosensitive device is responsive to the light transmitted by each mask.

16. The apparatus described in claim 12, wherein a separate photosensitive device is responsive to the light transmitted by each mask.

17. The apparatus described in claim 13, wherein a separate photosensitive device is responsive to the light transmitted by each mask.

18. The apparatus described in claim 12, wherein a photosensitive device is responsive to the light transmitted by a plurality of masks.

19. The apparatus described in claim 13, wherein a photosensitive device is responsive to the light transmitted by a plurality of masks.

20. An optical system comprising, in combination:
a first spherical mirror;
a second spherical mirror having a radius of curvature that approximately equals the radius of curvature of the first mirror and having its center located on the plane of the first mirror;
a third spherical mirror having a radius of curvature that approximately equals the radius of curvature of the second mirror and having its center located on the plane of the first mirror at a different point from the center of the second mirror;
an input transparency which is positioned in the plane of the first mirror and which contains a plurality of data elements;
a source of light directed at the transparency and at one of the second or third mirrors;
means for imaging the light that is transmitted by at least one of the mirrors;
a plurality of masks, each positioned in coincidence with one of said images, and each containing a transparent region corresponding to the location of at least one data element on the input transparency;
and a plurality of photosensitive devices each responsive to the light transmitted by one of said masks for providing an output signal that is representative of said transmitted light;
whereby the output signals are representative of data elements in the input transparency.

21. An optical system comprising, in combination:
a first spherical mirror;
a second spherical mirror having a radius of curvature that approximately equals the radius of curvature of the first mirror, and having its center located on the plane of the first mirror;
a third spherical mirror having a radius of curvature that approximately equals the radius of curvature of the second mirror and having its center located on the plane of the first mirror at a different point from the center of the second mirror;
an input transparency which is positioned in the plane of the first mirror and which contains a plurality of data elements;
a source of light directed at the transparency and at one of the second or third mirrors, for producing a pulse of light whose duration does not exceed the time required by light to travel a distance equal to double the radius of curvature of the mirrors;

means for imaging the light that is transmitted by at least one of the mirrors;

a plurality of masks, each positioned in coincidence with one of said images, and each containing a transparent region corresponding to the location of at least one data element on the input transparency;

and a photosensitive device responsive to the light transmitted by a plurality of said masks for providing a time-varying output signal that is representative of said transmitted light; whereby the output signal is representative of data elements in the input transparency as scanned in a predetermined sequence.

22. An optical system comprising, in combination:

means for applying an optical image to the system;

a plurality of reflectors having effective centers of curvature, that are arranged to multiply reflect the applied image to form reproduced images in the plane of one of the reflectors;

and indicating means, responsive to reproduce images for providing an indication that is dependent upon the applied image.

23. The apparatus described in claim 22, wherein the reflectors comprise spherical mirrors.

24. The apparatus described in claim 22, wherein one reflector is a spherical mirror having a high reflectivity, except for regions of low reflectivity, each of which corresponds to the position of a predetermined area of a reproduced image, and wherein the indicating means is responsive to light transmitted by these regions of low reflectivity.

25. An optical system comprising, in combination:

a first spherical mirror;

a second spherical mirror having a radius of curvature that approximately equals the radius of curvature of the first mirror, and having its center located on the plane of the first mirror;

a third spherical mirror having a radius of curvature that approximately equals the radius of curvature of the second mirror and having its center located on the plane of the first mirror at a different point from the center of the second mirror;

means for applying an optical image to the system in the plane of the first spherical mirror by directing a source of light at a transparency to cause reproductions of the applied image to be formed on the first mirror;

and indicating means responsive to the reproduced images for providing an indication that is dependent upon the applied image.

26. The apparatus described in claim 25, wherein the first mirror contains regions of low reflectivity at positions corresponding to predetermined areas of the reproduced images.

27. The apparatus described in claim 26, wherein the light source is modulated and wherein the indicating means comprises a photodetector which provides a time-varying output signal representative of the applied image as the light in the predetermined areas of the sequentially-formed reproduced images is applied to the photodetector.

No references cited.

RALPH G. NILSON, *Primary Examiner.*

T. N. GRIGSBY, *Assistant Examiner.*